June 27, 1939.  A. H. CUDDON-FLETCHER  2,164,230
INDUCTION SYSTEM FOR INTERNAL COMBUSTION ENGINES
Filed March 16, 1937  2 Sheets-Sheet 1

Inventor,
Angus Humphrey Cuddon-Fletcher,
by Frank S. Appleman
attorney

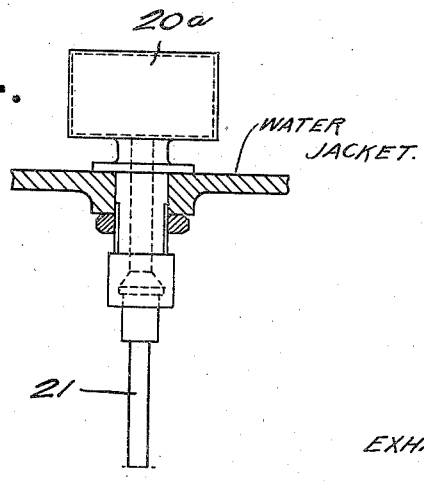
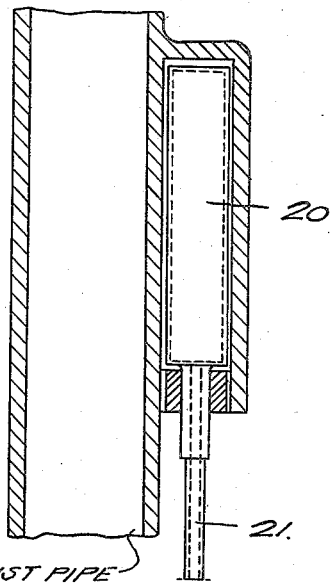
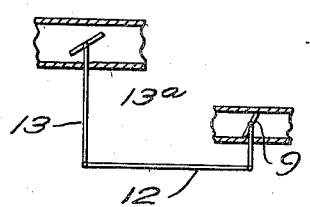
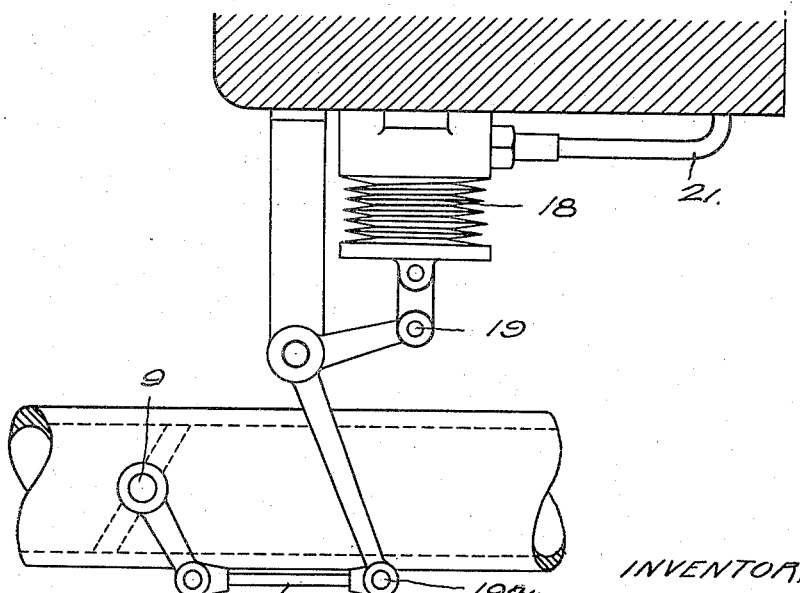

Patented June 27, 1939

2,164,230

UNITED STATES PATENT OFFICE 2,164,230

INDUCTION SYSTEM FOR INTERNAL COMBUSTION ENGINES

Angus Humphrey Cuddon-Fletcher, near Great Yarmouth, England

Application March 16, 1937, Serial No. 131,256
In Great Britain March 17, 1936

6 Claims. (Cl. 123—52)

This invention relates to improvements in induction systems for internal combustion engines.

In modern high efficiency engines having the peak of the power curve at a high rate of revolution one of the problems is to get a full charge of fuel mixture in the case of petrol engines or of air in the case of compression-ignition engines into the cylinders. One way of dealing with this problem is to provide each cylinder with two or more spaced ports or valves to which fuel mixture or air is supplied from separate induction pipes or manifolds. Thus the effective area of the passage for the fuel mixture or air is increased but the velocity of the fuel mixture or air is correspondingly decreased which leads to difficulties in starting and when the engine is running at low speeds.

The object of my invention is to provide simple and effective means for overcoming this difficulty.

My invention consists in providing additional means for conducting fuel mixture to the cylinders and providing supplementary means for controlling the flow of fuel mixture in these additional means.

Preferably two induction manifolds are provided to which fuel mixture is led from suitable supply means its quantity being controlled by the usual type of throttle valve. A supplementary throttle valve is provided in one of the induction manifolds so that the flow of mixture in this manifold can be restricted or shut off for starting the engine or during slow running. Fuel mixture or air is then supplied mainly or entirely by the other induction manifold and the velocity is correspondingly increased and better turbulence in the cylinder is obtained.

The auxiliary throttle may be operated in any convenient manner. For example it may be interconnected with the main throttle so that it is kept closed below a predetermined minimum opening of the main throttle or it may be interconnected with a choke control or it may be operated automatically by a thermostat so that it is held closed when the engine is cold and opened as soon as the engine reaches a predetermined temperature.

When separate means are provided for feeding fuel mixture to each of the induction manifolds it is preferable to provide a by-pass between the manifolds so that when one induction pipe or manifold is closed by the auxiliary throttle both blowers feed fuel mixture or air into the other induction pipe or manifold.

In order that the invention may be better understood the way of carrying the invention into practice is illustrated by way of example in the accompanying drawings. But various other constructions and modifications can be made without departing from the spirit of the invention.

Figure 4 is a schematic view showing a thermostat bulb suitable for use in connection with this invention as it appears when mounted in the water jacket of an engine.

Figure 5 is a schematic view of such a thermostat bulb as mounted against the side of an exhaust pipe in such an engine.

Figure 6 is an enlarged plan view of the thermostatic control as shown in Figure 1.

Figure 7 is a schematic view of the relation of the main and auxiliary throttle valves as used in connection with this invention in the form shown in Figure 3.

Figure 1:
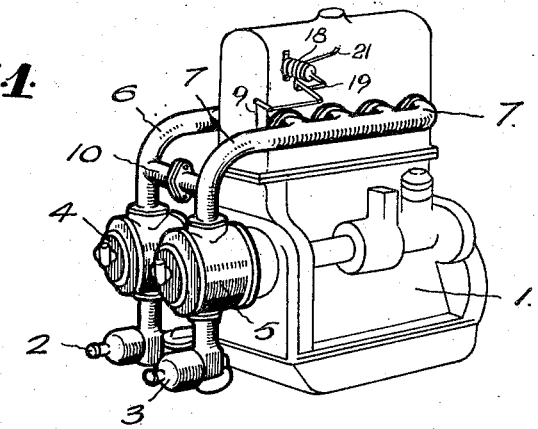
Figure 1 shows a general view of an internal combustion engine to which the invention has been applied.
Figure 2:
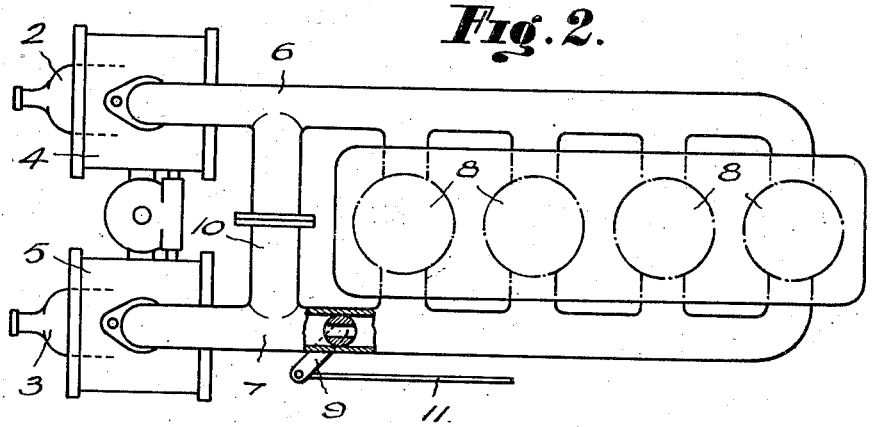
Figure 2 shows a plan view of an engine with two superchargers. Details of the throttle valve are also shown.

In Figure 1 a general view of an internal combustion engine 1 is shown, fuel-air mixture is supplied from the two carburettors 2 and 3 and superchargers 4 and 5 to two induction manifolds 6 and 7. As can be seen from Figure 2 these induction manifolds lead the fuel-air mixture to the cylinders 8; through valve controlled ports of any convenient known type, not shown in the drawings. Due to the fact that the fuel-air mixture is being fed into the cylinders from two sides through the two induction manifolds 6 and 7, it is possible to ensure that a full charge of fuel-air mixture is supplied to the cylinders when the engine is working at the peak of the power curve and at a high rate of revolution.

When the engine is running at low speeds or being started the quantity of fuel-air mixture required is less, with the result that the rate at which mixture flows along the induction manifolds is reduced with a corresponding reduction in turbulence which would lead to difficulties in starting. These are overcome however, by providing the auxiliary throttle valve 9 which can be closed to shut off the flow along the manifold 7. The mixture from the supercharger 5 then flows along the by-pass pipe 10 into the manifold 6 to which mixture is also being supplied by the supercharger 4. Thus the effect of the closing of the valve 9 is that the effective area of the induction manifolds and ports is halved while the velocity of flow of fuel mixture is doubled, thereby producing increased turbulence, easier starting and improved efficiency.

The valve may be operated in any convenient manner, for instance by having a connection 11 (Figure 2) which is linked up with the choke control so that the valve 9 is closed when the choke is operated for starting the engine.

When the engine is warm the volume of the mixture is increased so that the velocity of flow of the mixture does not fall so low as when the engine is cold. Accordingly the valve may be operated automatically by a thermostat 18 (Figure 1) of any convenient known type arranged so that the valve 9 is closed when the engine is cold and opens when the engine warms up.

A convenient known form of thermostat is shown in Figures 4, 5 and 6 and consists of an expansible chamber 18 (Fig. 6) which when expanded by fluid operates the valve 9 through the linkage 19, 19a. The expansible chamber 18 may be mounted in any convenient position and is operated by the expansion of a fluid contained in a bulb mounted in any desired place as, for instance, in the water jacket as shown at 20a in Figure 4 or on an exhaust pipe as shown at 20 in Figure 5. Its operation would be as follows: when the engine warms up, the thermosensitive fluid in the bulb expands and some of it is forced through the capillary tube 21 to the expansible chamber 18, which is caused to expand and operate the linkage to open the valve 9.

Figure 3:
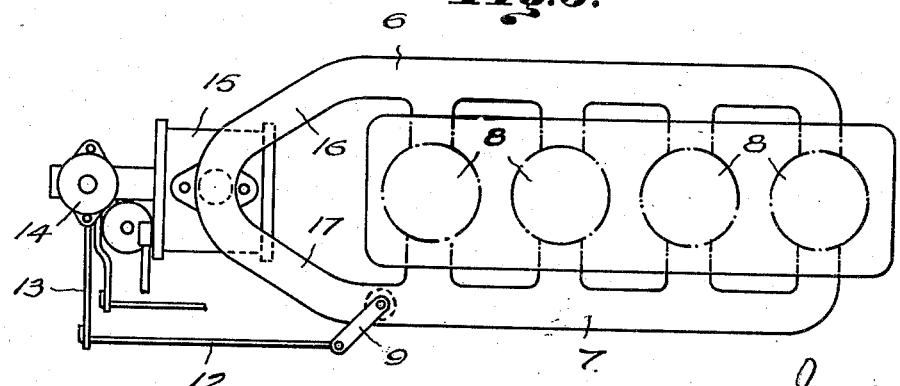
Figure 3 shows a plan view of the invention applied to an engine having only one supercharger.

If desired the opening of the valve 9 can be made dependent on the opening of the main throttle valve or accelerator control. This can be done by connecting its operating rod 12 to the means 13 operating the main throttle. As shown schematically in Figure 7, the main throttle valve 13a is somewhat open when the auxiliary throttle valve 9 is fully closed. Thus, further opening of the valve 13a will cause opening of the valve 9. This is shown in Figure 3 which also shows an engine supplied with fuel mixture by a single carburetter 14 and supercharger 15 via the branch pipes 16 and 17 and the manifolds 6 and 7.

The fuel-air mixture is to be regarded as the charge for the engine in the proportions to be varied so that when reference is made to the inlet charge, it is to be understood that the term is used to designate the fuel charge of the engine.

I claim:

1. In an internal combustion engine, the combination with the engine cylinders of two induction manifolds, means for supplying fuel mixture to the manifolds and temperature responsive means controlling the flow of fuel mixture in one of the manifolds.

2. In an internal combustion engine, an induction system comprising two induction manifolds, separate means supplying fuel mixture to each of the induction manifolds, a temperature controlled throttle valve in one of the manifolds and a by-pass pipe connecting the two manifolds together.

3. In an internal combustion engine having a plurality of cylinders the combination in the induction system of two interconnected manifolds arranged on opposite sides of said cylinders, a connection from each manifold to each cylinder, a supplementary throttle valve in one of the manifolds, said supplementary valve being arranged on the engine side of the connection between the two manifolds, and means for closing said supplementary valve to deflect the inlet charge from the one manifold into the other through the connection between them so that a full charge can be fed to the engine cylinders when it is working at high output and so that at low output the effective area of the induction manifolds and ports can be reduced to increase the velocity of flow of the charge and produce increased turbulence.

4. In an internal combustion engine having a plurality of cylinders the combination in the induction system of two interconnected manifolds arranged on opposite sides of said cylinders, a connection from each manifold to each cylinder, a supplementary throttle valve in one of the manifolds, said supplementary valve being arranged on the engine side of the connection between the two manifolds, and means for controlling said supplementary valve to restrict the flow of the charge in the manifold in which said valve is arranged during starting and slow running with low output of the engine.

5. In an internal combustion engine having a plurality of cylinders the combination in the induction system of two interconnected manifolds arranged on opposite sides of said cylinders, a connection from each manifold to each cylinder, a supplementary throttle valve in one of the manifolds, said supplementary valve being arranged on the engine side of the connection between the two manifolds, and means for controlling said supplementary valve automatically in accordance with the temperature of the engine arranged in such manner that said valve shall close when the engine is cold and shall open when the engine warms up.

6. In an internal combustion engine having a plurality of cylinders the combination in the induction system of two interconnected manifolds arranged on opposite sides of said cylinders, a connection from each manifold to each cylinder, a supplementary throttle valve in one of the manifolds, said supplementary valve being arranged on the engine side of the connection between the two manifolds, means for automatically controlling said supplementary valve, said means being interconnected with the ordinary throttle valve control means.

ANGUS HUMPHREY CUDDON-FLETCHER.